(12) United States Patent
Jang

(10) Patent No.: US 6,795,258 B2
(45) Date of Patent: Sep. 21, 2004

(54) ACTUATOR FOR OPTICAL PICKUP

(75) Inventor: Dae-jong Jang, Gyeonggi-do (KR)

(73) Assignee: Samsung Electronics, Co., LTD, Suwon-Si (KR)

( * ) Notice: Subject to any disclaimer, the term of this patent is extended or adjusted under 35 U.S.C. 154(b) by 0 days.

(21) Appl. No.: 10/164,694

(22) Filed: Jun. 10, 2002

(65) Prior Publication Data

US 2003/0002176 A1 Jan. 2, 2003

(30) Foreign Application Priority Data

Jun. 8, 2001 (KR) ........................................ 2001-31970

(51) Int. Cl.⁷ ................................................ G02B 7/02
(52) U.S. Cl. ........................ 359/822; 359/823; 359/824; 369/44.14; 369/44.15
(58) Field of Search ................................ 359/824, 814, 359/823, 808, 811, 813, 819, 822; 369/44.14, 44.15, 44.16

(56) References Cited

U.S. PATENT DOCUMENTS

| | | | | |
|---|---|---|---|---|
| 5,140,471 A | * | 8/1992 | Kasahara | .................... 359/824 |
| 5,313,334 A | * | 5/1994 | Tomiyama et al. | ......... 359/824 |
| 5,521,762 A | * | 5/1996 | Tomiyama et al. | ......... 359/814 |
| 5,598,397 A | * | 1/1997 | Sim | .......................... 369/244 |
| 5,949,590 A | * | 9/1999 | Hong | ........................ 359/814 |
| 6,341,104 B1 | * | 1/2002 | Yamaguchi et al. | ...... 369/44.15 |
| 6,377,521 B1 | * | 4/2002 | Kijima et al. | ............ 369/44.23 |
| 6,501,710 B2 | * | 12/2002 | Yokoyama et al. | ...... 369/44.14 |
| 6,507,554 B2 | * | 1/2003 | Son et al. | ................... 369/244 |
| 6,570,828 B2 | * | 5/2003 | Kikuchi et al. | .......... 369/44.32 |

FOREIGN PATENT DOCUMENTS

JP          4-163729          6/1992

* cited by examiner

Primary Examiner—Brandi Thomas
(74) Attorney, Agent, or Firm—Staas & Halsey, LLP

(57) ABSTRACT

An actuator for an optical pickup includes a magnetic circuit having a structure in which coils to drive an objective lens in one direction selected from a focusing, tilting, or tracking directions, and magnets to drive the objective lens in the other directions. The coils and magnets are installed on the bobbin. The actuator for an optical pickup reduces the number of wires required for 6-axis direction driving, thereby making assembly easy. The actuator includes magnets, yokes, and coils in the bobbin, thereby reducing the mass of the bobbin, improving sensitivity, and increasing the efficiency of magnetic force.

29 Claims, 4 Drawing Sheets

ACTUATOR FOR OPTICAL PICKUP

CROSS-REFERENCE TO RELATED APPLICATION

This application claims the benefit of Korean Application No. 2001-31970, filed Jun. 8, 2001, in the Korean Intellectual Property Office, the disclosure of which is incorporated herein by reference.

BACKGROUND OF THE INVENTION

1. Field of the Invention

The present invention relates to an actuator for an optical pickup, and more particularly, to an actuator for an optical pickup having an improved structure in which assembly is easier and sensitivity is increased.

2. Description of the Related Art

An actuator for an optical pickup drives an objective lens in a focusing direction, in a tracking direction and/or in a tilting direction. Actuators for optical pickups include moving coil type actuators, which have a coil installed on a bobbin, and moving magnet type actuators, which have a magnet installed on a bobbin.

Referring to FIG. 1, a conventional moving coil type actuator for an optical pickup includes a pair of focusing and/or tilting coils 11 installed at opposite ends of first sides of a bobbin 14 on which an objective lens 51 is installed. A pair of tracking coils 15 are installed at opposite ends of second sides of the bobbin 14. Tracking magnets 17, which are opposite the corresponding tracking coils 15, are installed on a base 10. Focusing and/or tilting magnets 13 are fixed and installed on external yokes 53, which are installed on the base 10 opposite the corresponding focusing and/or tilting coils 11. Internal yokes 55 are installed on the base 10 opposite the corresponding focusing and/or tilting coils 11. One end of each of four wires 19, which support the bobbin 14, and one end of each of two wires 19a, which are used to drive the bobbin 14 in a tilting direction, are coupled to the bobbin 14. The other end of each of the four wires 19 and the two wires 19a are coupled to a mount 12. The mount 12 is fixed to the base 10. The four wires 19 and the two wires 19a are paths used to apply current to the pair of focusing and/or tilting coils 11.

In the conventional moving coil type actuator for an optical pickup shown in FIG. 1, since the pair of focusing and/or tilting coils 11 and the pair of tracking coils 15 drive the objective lens 51 in focusing and tracking directions using a synchronous driving method, and the pair of focusing and/or tilting coils 11 drive the objective lens 51 in a tilting direction using an asynchronous driving method, the two wires 19a as well as the four wires 19, which are used as paths for applying current to the pair of focusing and/or tilting coils 11, are required. That is, six wires (four wires 19 and two wires 19a) are required for the conventional moving coil type actuator for an optical pickup shown in FIG. 1.

Since the bobbin 14 is light in weight, the conventional moving coil type actuator has a high sensitivity. However, since six wires (four wires 19 and two wires 19a) are required to drive the bobbin 14 in focusing, tracking, and tilting directions, the conventional moving coil type actuator has a complicated and cluttered structure and is difficult to assemble. That is, it is very difficult to attach six wires (four wires 19 and two wires 19a) to the narrow sides of the bobbin 14, resulting in an increase in defects.

Referring to FIG. 2, a conventional moving magnet type actuator for optical pickup includes four magnets 27, pairs of which are installed at corresponding opposite sides of a bobbin 24. At the center of the bobbin 24 is installed an objective lens 61. Two pairs of focusing and/or tilting coils 21 and two pairs of tracking coils 25 are installed on corresponding sides of a base 20 opposite corresponding pairs of the magnets 27. Four holders 29, which support the bobbin 24, are installed in a mount 22, which is fixed to the base 20. The four holders 29 only support the bobbin 24, and are thus unlike the wires 19, 19a of the conventional moving coil type actuator shown in FIG. 1.

As shown in FIG. 2, in the conventional moving magnet type actuator, the four magnets 27 are installed on the bobbin 24 and thus increase the mass of the bobbin 24. This increase in mass results in a decrease in a sensitivity of the actuator. Also, since the conventional moving magnet type actuator does not include yokes, it is difficult to obtain a path for a magnetic field. This difficulty decreases the efficiency of magnetic force in affecting the coils 21, 25.

SUMMARY OF THE INVENTION

To solve the above and other problems, it is an object of the present invention to provide an actuator for an optical pickup having an improved structure which is easier to assemble than a conventional moving coil type actuator for an optical pickup, and is more sensitive and uses magnetic force more efficiently than a conventional moving magnet type actuator for an optical pickup.

Additional objects and advantages of the invention will be set forth in part in the description which follows and, in part, will be obvious from the description, or may be learned by practice of the invention.

Accordingly, to achieve the above and other objects, there is provided an actuator for an optical pickup according to an embodiment of the invention that includes a bobbin on which an objective lens is installed, holders coupled between a mount installed on a base and the bobbin to support the bobbin such that the bobbin is movable with respect to the base, and a magnetic circuit installed in the bobbin and in the base to drive the objective lens in focusing, tracking, and tilting directions, wherein the magnetic circuit includes coils installed on the bobbin and which drive the objective lens in one direction selected from focusing, tilting, and tracking directions, and magnets installed on the bobbin to drive the objective lens in another direction selected from the focusing, the tilting, and the tracking directions.

According to an aspect of the invention, the magnetic circuit includes first and second coils installed at opposite first sides of the bobbin and are used to drive the objective lens in the focusing and the tilting directions, first and second magnets installed on the base opposite the corresponding first and second coils, tracking magnets installed at opposite second sides of the bobbin and are used to drive the objective lens in the tracking direction, and tracking coils installed on the base opposite the corresponding tracking magnets.

According to another aspect of the invention, the magnetic circuit includes first and second magnets installed at opposite first sides of the bobbin and are used to drive the objective lens in the focusing and the tilting directions, first and second coils installed on the base opposite the corresponding first and second magnets, tracking coils installed at opposite second sides of the bobbin and are used to drive the objective lens in a tracking direction, and tracking magnets installed on the base opposite the tracking coils.

According to yet another aspect of the invention, the holders comprise wires or leaf springs and are used as paths to apply current to the tracking or first and second coils installed on the bobbin.

According to still another aspect of the invention, the actuator further includes yokes to improve the efficiency of a magnetic force of the magnetic circuit.

According to still yet another aspect of the invention, the actuator further includes internal yokes installed on the base opposite the corresponding first and second coils, or external yokes installed on the base opposite the corresponding first and second magnets installed opposite the first and second coils.

According to a further aspect of the invention, the actuator further includes internal yokes installed on the base opposite the corresponding tracking coils, or external yokes installed on the base opposite the corresponding tracking magnets installed opposite the tracking coils.

According to a yet further aspect of the invention, the first, second, and tracking coils comprise fine pattern coils (FPCs).

According to a still further aspect of the invention, the actuator includes less than 6 wires connected to the bobbin.

According to a still yet further aspect of the invention, fewer than 4 magnets are on the bobbin having the fewer than 6 wires.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Figure 1:
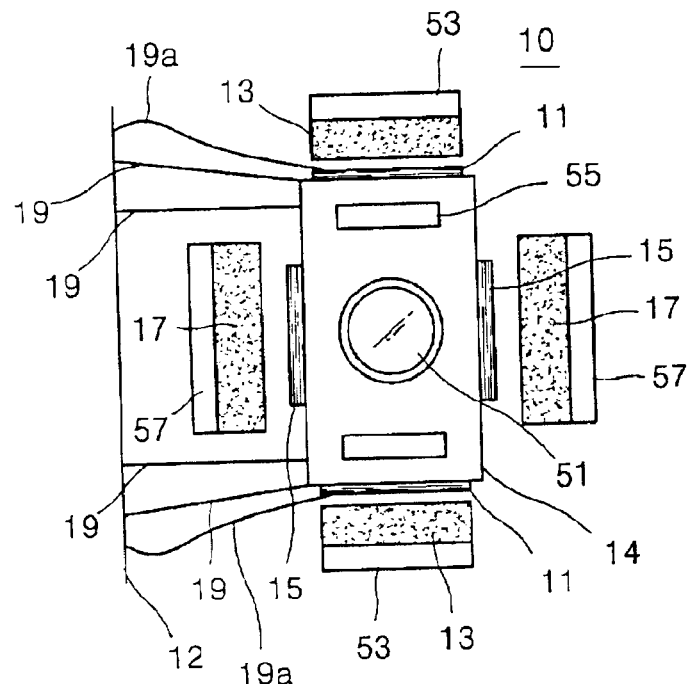
FIG. 1 is a schematic view of a conventional moving coil type actuator for an optical pickup.
Figure 2:
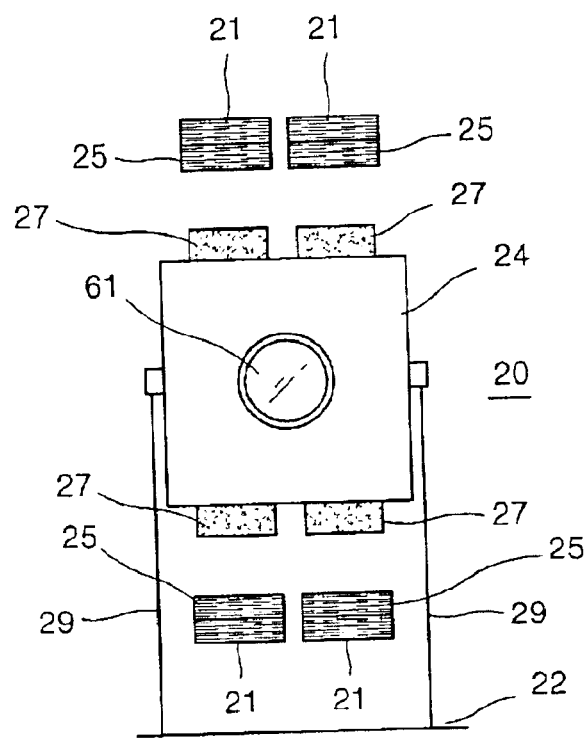
FIG. 2 is a schematic view of a conventional moving magnet type actuator for an optical pickup.

Hereinafter, embodiments of the present invention will be described in detail the invention with reference to the accompanying drawings, wherein like reference numerals refer to the like elements throughout. The embodiments are described below in order to explain the present invention by referring to the figures.

Figure 3:
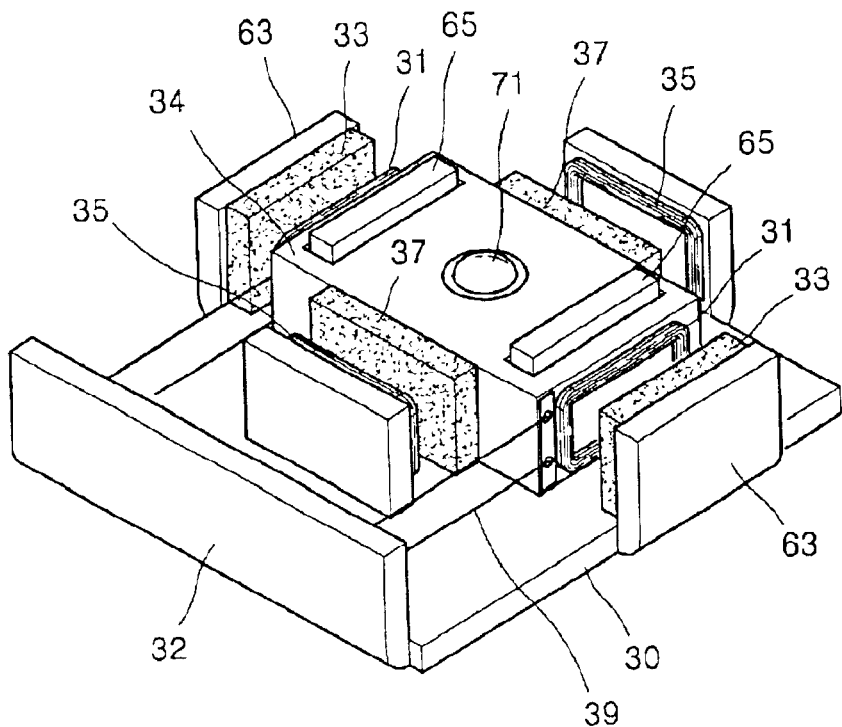
FIG. 3 is a schematic view of an actuator for an optical pickup according to an embodiment of the present invention.
Figure 4:
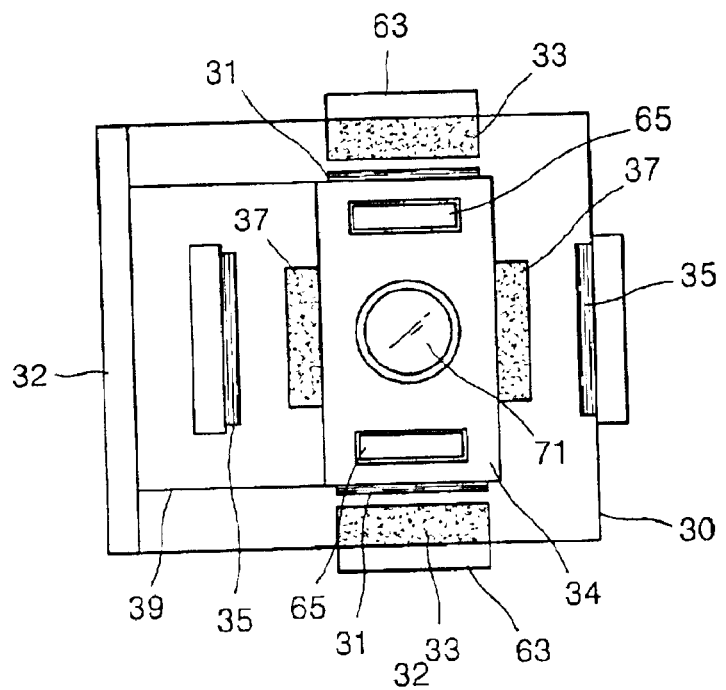
FIG. 4 is a plan view of the actuator shown in FIG. 3.

Referring to FIGS. 3 and 4, an actuator for an optical pickup according to an embodiment of the present invention includes first and second coils (i.e., focusing and/or tilting coils 31) installed at opposite first sides of a bobbin 34. Tracking magnets 37 are installed at opposite second sides of the bobbin 34. First and second magnets (i.e., focusing and/or tilting magnets 33) are installed on a base 30 opposite the corresponding focusing and/or tilting coils 31. Tracking coils 35 are installed on the base 30 opposite the corresponding tracking magnets 37.

Internal yokes 65 are installed on the base 30 opposite the corresponding focusing and/or tilting coils 31. External yokes 63 are installed on the base 30 opposite the corresponding focusing and/or tilting magnets 33. The focusing and/or tilting magnets 33 are installed on the external yokes 63 according to an embodiment of the invention, but need not be so installed in all aspects of the invention. Four holders 39 movably support the bobbin 34 with respect to the base 30. One end of the holder 39 is coupled to the bobbin 34, and the other end of the holders 39 is coupled to a mount 32 installed on the base 30. The holders 39 are used as paths to apply current to the focusing and/or tilting coils 31 installed on the bobbin 34. According to embodiments of the invention, the holder 39 comprises wires and/or leaf springs.

An objective lens 71 is installed on the bobbin 34. The bobbin 34 is driven in a focusing and/or tilting direction by the interaction of current flowing through the focusing and/or tilting coils 31 with the magnetic field of the focusing and/or tilting magnets 33. When force is simultaneously applied to the focusing and/or tilting coils 31 in a same direction by a synchronous driving method, the objective lens 71 is driven in a focusing direction. When force is applied to the focusing and/or tilting coils 31 in different directions by an asynchronous driving method (i.e., force is applied upward to a focusing and/or tilting coil 31 and force is applied downward to the other focusing and/or tilting coil 31), the objective lens 71 is rotated in a tilting direction. When force is simultaneously applied to the tracking magnets 37 and the tracking coils 35 in a same direction by a synchronous driving method, the objective lens 71 is driven in a tracking direction. In this way, the bobbin 34 is driven in three degrees of freedom. However, it is understood that the bobbin 34 could be driven in additional ones of the degrees of freedom using other combinations of applied forces.

Since the present invention includes coils 31 and magnets 37 on the bobbin 34, 6-axis direction driving is possible using only four holders 39. Further, when the holder 39 is a leaf spring instead of a wire, the leaf spring can be integrated into the base 30 according to an embodiment of the invention.

A neodymium (Nd) magnet, which is quite appropriate for a small size, is used as one of the magnets 33, 37 according to another embodiment of the invention. Also, a multiple magnet is used as one of the magnets 33, 37 so as to increase magnetic flux density in an air gap according to a further embodiment of the invention. However, other types and forms of magnets 33, 37 can be used.

The coils 31, 35 comprise conventional wound coils and/or fine pattern coils (FPCs) according to embodiments of the invention.

Figure 5:
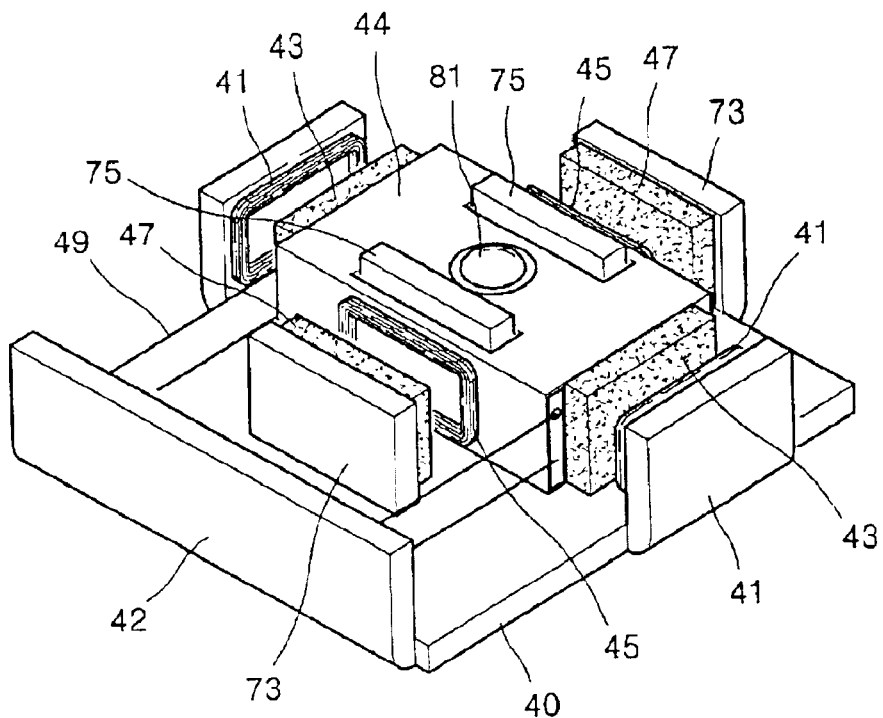
FIG. 5 is a schematic perspective view of an actuator for an optical pickup according to another embodiment of the present invention.
Figure 6:
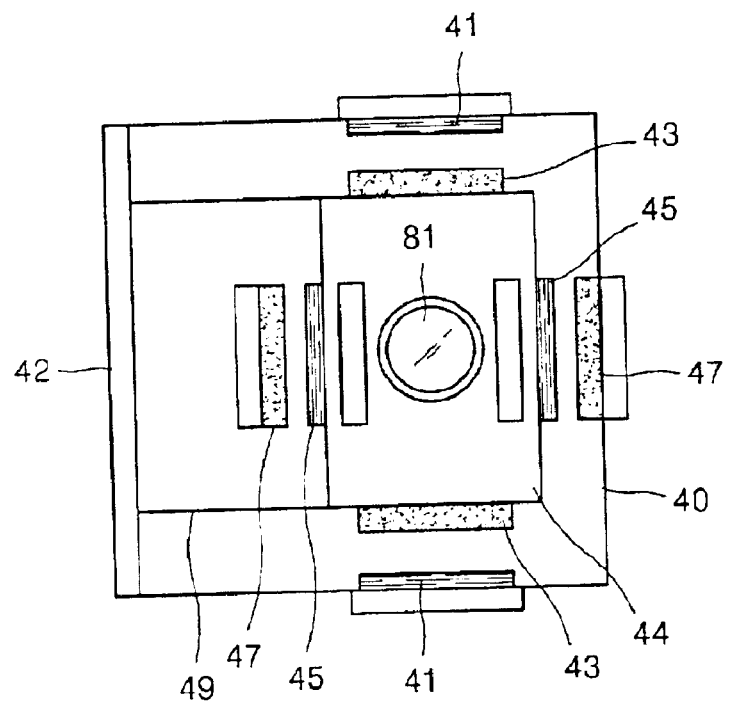
FIG. 6 is a plan view of the actuator shown in FIG. 5.

Referring to FIGS. 5 and 6, in the actuator for an optical pickup according to another embodiment of the present invention, the position of focusing and/or tilting coils 41 is exchanged with the position of focusing and/or tilting magnets 43, and the position of tracking magnets 47 is exchanged with the position of tracking coils 45 as compared to the embodiment shown in FIG. 3. Thus, in the actuator shown in FIG. 5, the focusing and/or tilting magnets 43 and the tracking coils 45 are installed on a bobbin 44. The focusing and/or tilting coils 41 are installed on a base 40 opposite the corresponding focusing and/or tilting magnets 43. The tracking magnets 47 are installed on the base 40 opposite the corresponding tracking coils 45. Internal yokes 75 are further installed on the base 40 opposite the corresponding tracking coils 45. External yokes 73 are further installed on the base 40 opposite the tracking magnets 47. The tracking magnets 47 are installed on the external yokes 73 in the shown embodiment, but it is understood that the tracking magnets 47 need not be so installed in all aspects of the invention.

The principle of driving in a focusing and/or tilting direction and in a tracking direction is the same as in the embodiment shown in FIG. 3. Specifically, the actuator for an optical pickup that includes the focusing and/or tilting coils 31 and the tracking magnets 37 installed on the bobbin 34 is included in the embodiment shown in FIG. 3. The internal yokes 65 are included opposite the focusing and/or tilting coils 31, and the external yokes 63 are included opposite the focusing and/or tilting magnets 33, resulting in obtaining paths for magnetic flux. The yokes 63, 65 need not be used in all aspects of the invention. The actuator for an optical pickup that includes the tracking coils 45 and the focusing and/or tilting magnets 43 installed in the bobbin 44 are included in the embodiment shown in FIG. 6. The internal yokes 75 are included opposite the tracking coils 45, and the external yokes 73 are included opposite the tracking magnets 47, resulting in obtaining paths for magnetic flux. The yokes 73, 75 need not be used in all aspects of the invention.

Figure 7:
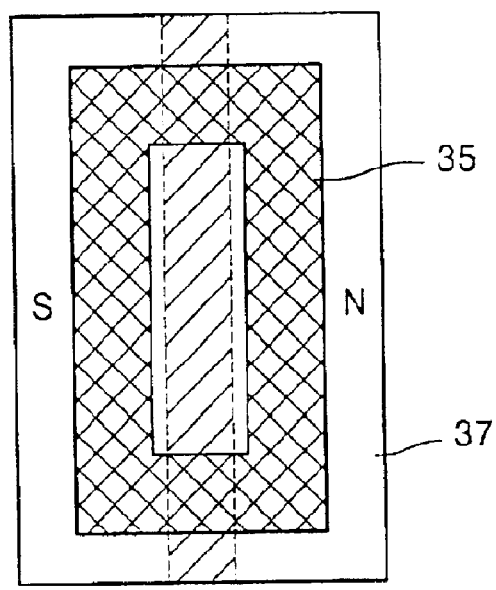
FIG. 7 illustrates the arrangement of tracking coils and magnets of the actuator shown in FIG. 3.

The arrangement of magnets 31, 37 and coils 33, 35 of the actuator will be explained with reference to the embodiment of the present invention shown in FIGS. 3 and 4 using FIGS. 7 and 8. The principle of force applied in a tracking direction can be known from the arrangement of the tracking coils 35 and the tracking magnets 37. In accordance with Fleming's law, when magnetic flux flows from the left sides of the tracking coils 35 to the ground and current flows upward, force is applied to the left sides of the tracking coils 35. When current flows downward, force is applied to the right sides of the tracking coils 35, and thus, the tracking coils 35 can be driven in the tracking direction. This same principle is applied to force applied in the tracking direction in the arrangement of the tracking coils 45 and the tracking magnets 47 according to the embodiment of the present invention shown in FIG. 6.

Figure 8:
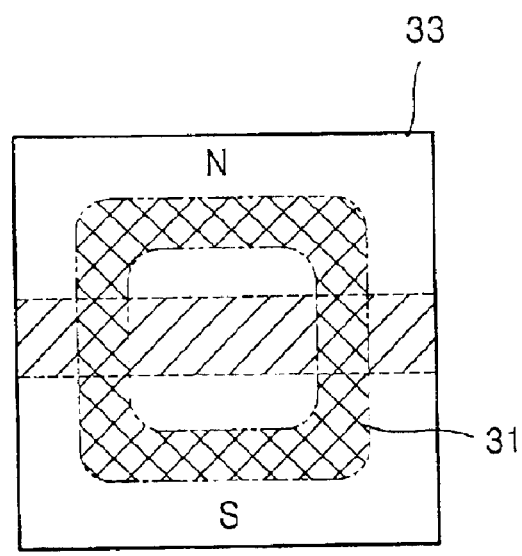
FIG. 8 illustrates the arrangement of focusing and tilting coils and magnets of the actuator shown in FIG. 3.

Referring to FIG. 8, the principle of force applied in a focusing and/or tilting direction can be known from the arrangement of the focusing and/or tilting coils 31 and the focusing and/or tilting magnets 33. Also, in accordance with Fleming's law, when magnetic flux flows from upper portions of the focusing and/or tilting coils 31 to the ground and current flows from left to right, force is applied upward to the focusing and/or tilting coils 31. When current flows from right to left, force is applied downward to the focusing and/or tilting coils 31. When force is applied to the focusing and/or tilting coils 31 in the same direction, the bobbin 34 is driven in the focusing direction, which is roughly parallel with the optical axis of the objective lens 71. When force is applied to the focusing and/or tilting coils 31 in different directions, the bobbin 34 is driven to rotate in the tilting direction. This principle is also applied to force applied in the focusing and tilting directions in the arrangement of the focusing and/or tilting coils 41 and the focusing and/or tilting magnets 33 according to the embodiment of the present invention shown in FIG. 6.

The middle portion of each of the magnets 33, 37 is a neutral zone that a magnetic force does not affect. Higher magnetic flux is distributed at both ends of each of the magnets 33, 37. According to an embodiment of the invention the magnets 33, 37 are multiplied at opposite ends of each of the magnets 33, 37, resulting in higher magnetic flux density in an air gap and thus a greater effect on the coils 31, 35.

According to the present invention, coils and magnets are on the bobbin, thereby reducing the number of wires compared with the conventional moving coil type actuator for an optical pickup having only coils on a bobbin, and making assembly easy. Further, the mass of the bobbin is reduced compared to the conventional moving magnet type actuator for an optical pickup, thereby improving sensitivity, and further includes yokes on the base, thereby increasing the efficiency of magnetic force.

In the actuator for an optical pickup according to the present invention, assembly of the actuator is simpler than the assembly of the conventional moving coil type actuator for an optical pickup, and the mass of the bobbin is reduced compared with the mass of the conventional moving magnet type actuator for an optical pickup, thereby improving sensitivity of the actuator for an optical pickup. And if the actuator further includes yokes, magnetic force is used more efficiently. It is further understood that the actuator could be used in devices other then optical pickup assemblies, and that the bobbin could be made to move in others of the six degrees of freedom.

While this invention has been particularly shown and described with reference to preferred embodiments thereof, it will be understood by those skilled in the art that various changes in form and details may be made therein without departing from the spirit and scope of the invention as defined by the accompanying claims and equivalents thereof.

What is claimed is:

1. An actuator usable in an optical pickup, the actuator comprising:
   a bobbin to hold an objective lens;
   a base including a mount;
   holders coupled between the mount and said bobbin to support said bobbin such that said bobbin is movable with respect to said base; and
   a magnetic circuit installed at said bobbin and at said base to drive the objective lens in focusing, tracking, and tilting directions;
   wherein:
      said magnetic circuit comprises:
         bobbin coils to drive the objective lens in one direction selected from focusing, tilting, and tracking directions, and
         bobbin magnets to drive the objective lens in the other directions selected from the focusing, the tilting, and the tracking directions, and
      the bobbin coils and the bobbin magnets are installed on said bobbin.

2. The actuator of claim 1, wherein:
   the bobbin coils comprise first and second coils installed at opposite first sides of said bobbin and are used to drive the objective lens in the focusing and the tilting directions;
   the bobbin magnets comprise tracking magnets installed at corresponding opposite second sides of said bobbin and are used to drive the objective lens in the tracking direction; and
   said magnetic circuit further comprises:
      first and second magnets installed on said base opposite the corresponding first and second coils,
      tracking coils installed on said base opposite the corresponding tracking magnets.

3. The actuator of claim 1, wherein:
   the bobbin magnets comprise first and second magnets installed at corresponding opposite first sides of said bobbin and are used to drive the objective lens in the focusing and the tilting directions;

the bobbin coils comprise tracking coils installed at corresponding opposite second sides of said bobbin and are used to drive the objective lens in the tracking direction; and said magnetic circuit further comprises
first and second coils installed on said base opposite the corresponding first and second magnets, and
tracking magnets installed on said base opposite the corresponding tracking coils.

4. The actuator of claim 1, wherein said holders comprise wires and/or leaf springs and provide paths to apply current to the bobbin coils installed at said bobbin.

5. The actuator of claim 2, wherein said holders comprise wires and/or leaf springs and provide paths to apply current to the bobbin coils installed at said bobbin.

6. The actuator of claim 3, wherein said holders comprise wires and/or leaf springs and provide paths to apply current to the bobbin coils installed at said bobbin.

7. The actuator of claim 4, wherein the bobbin coils installed at said bobbin comprise fine pattern coils (FPCs).

8. The actuator of claim 5, wherein the bobbin coils installed at said bobbin comprise fine pattern coils (FPCs).

9. The actuator of claim 6, wherein the bobbin coils installed at said bobbin comprise fine pattern coils (FPCs).

10. The actuator of claim 1, wherein the bobbin coils installed at said bobbin comprise fine pattern coils (FPCs).

11. The actuator of claim 2, wherein the bobbin coils installed at said bobbin comprise fine pattern coils (FPCs).

12. The actuator of claim 3, wherein the bobbin coils installed at said bobbin comprise fine pattern coils (FPCs).

13. The actuator of claim 1, further comprising yokes to improve an efficiency of a magnetic force of said magnetic circuit.

14. The actuator of claim 2, further comprising yokes to improve an efficiency of a magnetic force of said magnetic circuit.

15. The actuator of claim 3, further comprising yokes to improve an efficiency of a magnetic force of said magnetic circuit.

16. The actuator of claim 15, wherein said yokes comprise:

internal yokes disposed on said base between the objective lens and the corresponding bobbin coils, and external yokes disposed on said base and adjacent the corresponding base magnets.

17. The actuator of claim 12, wherein the bobbin magnets comprise neodymium magnets.

18. The actuator of claim 1, wherein:
said holders comprise less than six wires and provide current to the bobbin coils, and
said bobbin holds less than four bobbin magnets.

19. The actuator of claim 1, wherein:
the focusing direction is substantially parallel with an optical axis of the objective lens,
the tracking direction is perpendicular to the focusing direction, and
the tilting direction rotates about a rotational axis perpendicular to both the focusing and tracking directions.

20. An actuator to hold a lens, comprising:
a bobbin to hold the lens;
a base including a mount;
a magnetic circuit formed at said bobbin and at said base, said magnetic circuit comprising bobbin coils and bobbin magnets on said bobbin and which use corresponding base magnets and base coils on said base to selectively move and/or rotate said bobbin along ones of six degrees of freedom; and
holders coupled between the mount and said bobbin to support said bobbin such that said bobbin moves relative to said base and to provide current to the bobbin coils.

21. The actuator of claim 20, wherein the bobbin coils and the base magnets drive said bobbin to rotate about a rotational axis and to move along an axis substantially parallel with an optical axis of the lens.

22. The actuator of claim 21, wherein the bobbin magnets and the base coils drive said bobbin to move along an axis substantially perpendicular with the optical axis.

23. The actuator of claim 20, wherein the bobbin magnets and the base coils drive said bobbin to rotate about a rotational axis and to move along an axis substantially parallel with an optical axis of the lens.

24. The actuator of claim 23, wherein the bobbin coils and the base magnets drive said bobbin to move along an axis substantially perpendicular with the optical axis.

25. The actuator of claim 20, wherein one of the bobbin magnets comprises a multiple magnet.

26. The actuator of claim 20, wherein one of the base magnets comprises a multiple magnet.

27. The actuator of claim 20, wherein the bobbin magnets each comprise a neutral area between opposite ends of the bobbin magnet, and a higher magnetic flux is distributed at the opposite ends of the bobbin magnet than at the neutral area.

28. The actuator of claim 27, wherein the neutral area extends in a direction substantially parallel with an optical axis of the lens such that the bobbin magnets provide a force in a direction substantially perpendicular to the optical axis.

29. The actuator of claim 27, wherein the neutral area extends in a direction substantially perpendicular to an optical axis of the lens such that the bobbin magnets provide a force in a direction substantially parallel with the optical axis.

* * * * *